Patented June 12, 1951

2,556,885

UNITED STATES PATENT OFFICE 2,556,885

COATED PRODUCTS

Arthur Bernard Ness, Marshallton, Del., assignor to E. I. du Pont de Nemours & Company, Wilmington, Del., a corporation of Delaware No Drawing. Application June 27, 1946,
Serial No. 679,867

3 Claims. (Cl. 117—76)

This invention relates to the art of coating, particularly to vinyl chloride polymer coated fabrics.

Until recently, cotton fabrics were used almost exclusively for coated fabrics, while the polymers commonly employed for the coating composition were cellulose derivatives or rubber. These materials possess a specific affinity for cotton which aids the anchorage of the coating to the fabric. In addition, a mechanical-type adhesion is also obtained due to the embedding of the wick ends of the staple cotton fiber in the coating composition. As a result, there was little or no problem in obtaining good anchorage in these products. The vinyl chloride polymers, on the other hand, possess little adhesion for other materials, and their adhesion is particularly poor when the base fabric is one woven from nylon, rayon, glass or other fabric woven from continuous filament synthetic fibers.

This invention has as an object a new and useful vinyl chloride polymer coated fabric. A further object is an improved coated flexible fabric which is characterized by superior anchorage between the coating and the fabric base, and which comprises a vinyl chloride polymer coated fabric in which the fabric base is composed of synthetic continuous filament fabric. Other objects will appear hereinafter.

These objects are accomplished by interposing between the vinyl chloride polymer coating and the base fabric, a coating comprising an aqueous composition of a butadiene-acrylonitrile copolymer and a water-soluble phenol-formaldehyde thermosetting resin.

In carrying out the invention a coating of the above defined composition is applied to the fabric, the water is removed from the anchor coat by heating, and the vinyl chloride polymer coating composition is then applied directly to the anchored fabric either by spreading or calender coating techniques, well known in the art. The invention is further illustrated by the following examples in which the parts given are by weight unless otherwise specified.

As will be shown by the examples below this anchor coating provides an adhesion between the fabric and vinyl chloride polymer that is not obtainable by intermediate coatings that have been found useful as anchor coats in the case of polymers other than vinyl chloride polymers. In these examples the parts are by weight unless otherwise specified.

Example I

To a solution of 10 parts of water-soluble phenol-formaldehyde thermosetting resin in 10 parts of water was added slowly with stirring 100 parts of a 40% solids aqueous dispersion of a butadiene-acrylonitrile copolymer, the composition of which is approximately 60 parts of butadiene to 40 parts of acrylonitrile. A doctorknife application of the resulting composition was made to each side of a 1.8 ounce square woven 80x80 to 85x85 thread count nylon fabric. After each application the fabric was dried (five minutes at 80° C.).

A coating composition, comprising a methyl ethyl ketone solution of plasticized vinyl chloride polymer composition pigmented in an olive drab color, was applied to both sides of the fabric by spreading. Approximately 2 ounces per square yard of coating composition was applied to each side and the product met the construction specifications of Quartermaster Corps Tentative Specifications PQD 438. The anchorage between the coating composition and the base fabric was measured by the method given in Paragraph F3g in the specifications mentioned above, and values of 6.8 and 10.4 lbs./2 in. strip were obtained for each side. This anchorage was considerably superior to that obtained on a suitable control which had anchorage values of only 2.0 and 3.2 lbs./2 in. strip. This control had the conventional anchor coat comprising a fairly fluid methyl ethyl ketone solution of a vinyl chloride-vinyl acetate/90-10 interpolymer plasticized with the neutral phthalic ester of the monobutyl ether of ethylene glycol and an ester type plasticizer.

Similar constructions on a rayon fabric, a 3 ounce nylon basket weave cloth, and a fabric woven from polyacrylonitrile fibers, each of which was anchored with the aqueous composition mentioned above, had anchorage values of 10 lbs./2 in. strip, 5 lbs./2 in. strip and 4 lbs./2 in. strip respectively, as compared with 3.6 lbs./2 in. strip, 0 lb. /2 in. strip, and 2.4 lbs./2 in. strip for the respective controls which utilized the methyl ethyl ketone solution of the plasticized vinyl chloride-vinyl acetate copolymer anchor composition mentioned above.

Very poor anchorage was realized where the butadiene-acrylonitrile copolymer mentioned above was dissolved in an organic solvent and combined with the phenol-formaldehyde resin used in the foregoing example as described below. A solution of 10 parts of this resin in 30 parts of water was added slowly to a 16% solution of butadiene-acrylonitrile copolymer (60/40) in methyl ethyl ketone. The resulting composition was clear and contained no precipitated resin or rubber. This solution was applied to both sides of a 1.8 oz. nylon poncho fabric as an anchor coat and after drying was double-coated by spreading with a plasticized and pigmented vinyl chloride polymer coating composition to a construction similar to that described above. The resulting product had anchorage values of only 4.0 and 2.4 lbs./2 in. strip for each side, as compared to the excellent values of 6.3 and 10.4 lbs./2 in. obtained with the aqueous composition.

*Example II*

An anchor composition comprising the butadiene-acrylonitrile copolymer latex mentioned in Example I, a 50% solids vinyl chloride-ethyl acrylate (80:20) aqueous dispersion containing the phenol-formaldehyde resin used in Example I, and the previously mentioned neutral ester plasticizer in the proportion of 4/2/1/1 on a solids basis was prepared as follows: To a mixture, containing 10 parts of the plasticizer, 0.4 part of oleic acid and 0.72 part of 28% aqueous ammonium hydroxide, was added slowly with stirring 40 parts of the vinyl chloride copolymer aqueous dispersion mentioned above. The resulting mixture was a dispersion of the plasticizer in the external phase of the vinyl chloride copolymer latex. To this was then added 0.4 part of the sodium salt of a hydrocarbon sulfonic acid (Ind. Eng. Chem., 35, 126 (1943)) and 100 parts of the butadiene-acrylonitrile (60/40) copolymer latex. This composition was then added with stirring to a solution of 10 parts of the phenol-formaldehyde resin used in Example I in 10 parts of water. A coated fabric employing this composition as the anchor coat was prepared in the same manner as described in Example I. Excellent anchorage values for each side of 8.2 and 7.2 lbs./2 in. strip were obtained as compared to the low control values mentioned in Example I.

When the above-described anchor composition was applied to the 1.8 ounce nylon fabric mentioned in Example I by immersing the fabric in the composition and removing the excess material by passing through squeeze rollers, 0.7 ounce per sq. yd. of composition was applied to the fabric. A coated fabric similar to that described in Example I, with this impregnated fabric as the base fabric, possessed superior anchorage values of 6.4 and 7.2 lbs./2 in. strip for each side.

Considerably poorer anchorage values were obtained when a methyl ethyl ketone solution of materials similar to the ingredients in the aqueous composition was used as the anchor coat.

*Example III*

The aqueous anchor composition described in Example I was applied to a 1.32/53 in. cotton sateen fabric and after the water had been removed from the anchor composition, approximately 8 oz./sq. yd. of a methyl ethyl ketone solution of a plasticized and pigmented polyvinyl chloride coating composition was applied to the anchored side of the fabric by spread coating. The coated product had an excellent anchorage of 13.4 lbs./2 in. strip as compared with only 4 lbs./2 in. strip for a control fabric. The control fabric had been anchored with the methyl ethyl ketone solution of the plasticized vinyl chloride-vinyl acetate (90/10) copolymer composition mentioned in Example I and coated with the same color coat mentioned in the first part of this example.

*Example IV*

The aqueous anchor composition described in Example II was coated on a 3 oz. nylon basket weave cloth, and a glass fabric. After drying the anchor coat, both materials were double-coated with a methyl ethyl ketone solution of plasticized polyvinyl chloride composition pigmented olive drab. The final construction of these materials approximated that mentioned in Example I. In the case of the 3 oz. nylon basket weave cloth product, superior anchorage values of 7.7 and 8.0 lbs./2 in. strip for each side were obtained as compared to only 1.0 lb./2 in. strip for each side of the control. Excellent values of 10 lbs./2 in. strip were realized on each side of the coated glass fabric as compared to only 5 lbs./2 in. strip for the control. Both controls were anchor-coated with a fluid methyl ethyl ketone solution of plasticized vinyl chloride-vinyl acetate (90/10) copolymer composition. Plasticizers used were those used in the anchor coat mentioned in Example I.

*Example V*

An anchor composition similar to that described in Example III excepting that an equivalent amount of a 40% solids aqueous latex of a butadiene-acrylonitrile (75/25) copolymer was used in place of butadiene-acrylonitrile (60/40) latex, was applied as an anchor coat with 1.8 oz. nylon mentioned in Example I. A product similar in construction to that described in Example I was prepared and the coated fabric was found to have good anchorage values of 8.8 and 5.2 lbs./2 in. strip for each side.

*Example VI*

A series of coated fabrics was prepared in which varying solid ratios of butadiene-acrylonitrile (60-40) copolymer latex and the water-soluble phenol-formaldehyde resin described above were used in the anchor coats. Butadiene-acrylonitrile (60-40) copolymer and the phenol-formaldehyde resin were examined in solids ratios of 57/43, 65/35, 80/20 and 90/10. The anchor coats were prepared in a manner similar to that described for the aqueous composition in Example I, and the construction of the final product approximated that given in Example I. Excellent anchorage values of 8 lbs./2 in. strip, 8.2 lbs./2 in. strip, 8.0 lbs./2 in. strip and 6.0 lbs./2 in. strip were obtained on the 57/43, 65/35, 80/20 and 90/10 copolymer/resin ratio anchor coats respectively as compared to the low anchorage values given for the control in Example I.

*Example VII*

A resorcinol-formaldehyde resin was prepared by adding 4.3 parts of a formalin solution (37% by weight formaldehyde in water) to a solution of 8 parts of resorcinol in 10 parts of water containing 4 parts of a 10% sodium hydroxide solution. After mixing, the solution was allowed to stand for 4 hours and then added slowly with stirring to 40 parts of the butadiene-acrylonitrile (60-40) copolymer latex mentioned in Example I. This composition was applied as an anchor to both sides of a 1.8 oz. nylon fabric mentioned in Example I. After drying, the fabric was spread coated with a methyl ethyl ketone solution of a plasticized and pigmented vinyl chloride containing polymer composition to a construction similar to that described in Example I. The resulting product had good anchorage values of 6.0 lbs./2 in. strip for each side.

*Example VIII*

A mixture comprising 4 parts of mercaptobenzothiazole, 8 parts of sulfur, 12 parts of zinc oxide, 80 parts of a medium fine clay used in compounding rubber and plastics, 1.25 parts of the sodium salt of an alkyl sulfate (Ind. Eng. Chem., 35, 126 (1943)), and 240 parts of water was ball milled for 24 hours. To 35 parts of this dispersion was added 2 parts of a 10% aqueous sodium hydroxide solution, 4 parts of a 10% aqueous solution of piperidinium pentamethylenedithiocarbamate and 100 parts of the 40% solids butadiene-acrylonitrile (75/25) copolymer latex mentioned in Example VI. This resulting composition was added slowly with agitation to a solution of 10 parts of the phenol-formaldehyde resin used in Example I in 10 parts of water. This composition was applied as an anchor coat to one side of a 1.12/53 in. cotton sateen fabric. After drying, a plasticized and pigmented vinyl chloride-vinyl acetate (95/5) copolymer composition was calendered to the anchor side. The resulting upholstery construction material had a superior anchorage value of 12 lbs./2 in strip and this anchorage was still maintained a month after fabrication. A control using an anchor coat comprising a methyl ethyl ketone solution of a plasticized vinyl chloride-vinyl acetate (90/10) copolymer composition and the same color coat as used above had anchorage values of only 4 lbs./2 in. strip. The butadiene-acrylonitrile (75/25) copolymer composition mentioned above cures during the heating required to dry the fabric and apply the hot calender coat. Curing will also result if the dried composition is allowed to stand at room temperature for several days.

As will be observed in the examples above, noteworthy anchorage improvement is realized only with aqueous compositions. In all cases where a solution of the essential ingredients butadiene-acrylonitrile copolymer rubber and phenol-formaldehyde resin were used in an organic solvent, the anchorage obtained was never greater and very often less than the control. The objects of this invention therefore are accomplished only by the use of an aqueous anchor system comprising among its ingredients a butadiene-acrylonitrile copolymer rubber latex and water-soluble thermosetting phenol-formaldehyde resin.

For best results, the phenol-formaldehyde resin is dissolved in water and this solution is then combined with a dispersion of the butadiene-acrylonitrile copolymer. Butadiene-acrylonitrile copolymers containing from 15 to 60% acrylonitrile are effective, although it is preferred to use a copolymer containing from 25 to 45% of acrylonitrile. These copolymers are used in the form of their commercially available latices, and although a wide range of solids concentrations can be employed, the best results are obtained with a relatively high solids latex, e. g. 20–60%. Aqueous dispersions prepared from the solid rubber by methods well known in the dispersing art are also suitable. The phenol-formaldehyde resin used is restricted only by the requirement that the material be water-soluble and thermosetting. A general method for preparing water-soluble, thermosetting phenol-formaldehyde resins of the kind used in the foregoing examples is to react phenol in an aqueous medium with 1–5 mole equivalents of formaldehyde (37% by weight aqueous formaldehyde solution) in the presence of 1–10%, based on the reactants, of a basic catalyst such as sodium hydroxide, ammonia, or borax. The reaction is conveniently carried out at room temperature and is stopped before an insoluble phase is formed. The reaction mixture is finally neutralized and the condensation product is isolated by removing the water under reduced pressure at 20 to 30° C. Other water-soluble, thermosetting phenol-formaldehyde resins which are operable include those prepared in a manner similar to that described above from formaldehyde and phenols such as orcinol and resorcinol.

Various copolymer/resin compositions in the range of 50–90% butadiene/acrylonitrile copolymer and 50–10% phenol-formaldehyde resin are operable. The use of anchoring compositions containing from 65–90% copolymer and from 10–35% of phenol-formaldehyde resin results in the best combination of coated fabric properties, particularly with respect to anchorage and pliability, and is accordingly preferred. Other materials can be added to the anchor compositions to give varying results. For example, it may be desirable to add a vinyl chloride copolymer dispersion to the anchor composition such as described in Example III. The vinyl chloride copolymer dispersion, however, should not comprise more than 50% of the anchor composition. When required the pliability of the resulting product can be improved by adding a small amount of a softening agent or plasticizer to the anchor composition. This may be done in the manner described in Example III, and is particularly desirable in such cases where a vinyl chloride containing polymer dispersion is also added to the anchor composition. To improve the wetting of a fabric by the anchor composition up to 5% of a surface-active agent such as the sodium salt of a hydrocarbon sulfonic acid (Ind. Eng. Chem., 35, 126 (1943)) may be added. Other wetting agents well known to the art may be used. The viscosity of the anchor composition can also be controlled, and in cases where greater fluidity is desired, this easily accomplished by adding water to reduce solids. If it is desired to increase the viscosity of the composition such water-soluble thickening agents as polyvinyl alcohol, methyl cellulose and other thickening agents well known to the art may be added until the desired viscosity is reached.

The vinyl chloride containing polymer coating composition may be applied to the anchored fabric by any suitable coating method such as by calendering or by spreading a solution or dispersion of the polymers in organic solvents or in water.

For some purposes it is desirable to cure the butadiene-acrylonitrile copolymer after it has been placed on the fabric as illustrated in Example VIII. Cured anchor compositions will provide higher bond strengths and better aging properties. For example, in the case of plasticizer migration from the color coat to the anchor coat, a cured anchor coat containing a filler will retain its tensile strength better than an uncured and unfilled composition. In selecting a curing formulation for the butadiene-acrylonitrile copolymer it is best to choose the agents so that the formulation will cure very rapidly. In this manner, no additional curing cycle will be required other than the heat encountered during drying or calendering. Such compositions when dry, will also cure on standing at room temperature for several days. The composition given in Example VIII is an example of such self-curing formulations. This and other curing formulations all well known in the rubber art, are suitable.

By the term "vinyl chloride containing polymer" used herein, we mean a homopolymer or interploymer of vinyl chloride in which the major constituent is vinyl chloride. Examples of such materials are polyvinyl chloride, vinyl chloride interpolymers with vinyl acetate, acrylic and methacrylic esters, dimethyl fumarate, diethyl fumarate and other materials interpolymerizable with vinyl chloride and well known in the polymerization art.

The use of the aqueous anchor compositions mentioned above will improved the product performance in other respects in addition to anchorage. For example, in upholstery type materials, the products will possess better resistance to failure while being subjected to a flexing or scrubbing action. In addition, premature failure due to the separation of the coating from the fabric will not occur. In light weight coating constructions, the products anchored with the aqueous anchor compositions disclosed herein will possess greater waterproofness and better tensile strength. Where used in lightweight tent constructions, there will be considerably less tendency for coatings to flake and separate from the fabric when subjected to blizzard conditions, i. e., simultaneous intense cold and high wind.

The present invention, as has been previously indicated, is of particular value in the manufacture of improved vinyl chloride polymer coated flexible fabrics in which the fabric is nylon, glass fabrics, fabrics woven from polyacrylonitrile polymers, or other fabrics woven from other continuous filament synthetic fibers. This invention, however, is also applicable in the manufacture of vinyl chloride polymer coated products which are characterized by improved adhesion between the polymer and the base and in which the base is cotton, wood, iron or other material possessing affinity for either the phenolic resin or the synthetic rubber ingredient.

As many apparently widely different embodiments of this invention may be made without departing from the spirit and scope thereof, it is to be understood that I do not limit myself to the specific embodiments thereof except as defined in the appended claims.

I claim:

1. An article of manufacture comprising a base material having a coating of vinyl chloride polymer, and an anchor coating between said base material and polymer coating and adhesively joining said base material and polymer coating, said anchor coating being the dried film obtained from an aqueous composition of a butadiene-acrylonitrile copolymer and a water-soluble phenol-formaldehyde thermosetting resin.

2. A flexible coated article of manufacture comprising a textile fabric base having a coating of vinyl chloride polymer, and an anchor coating between said base and polymer coating and adhesively joining said base and polymer, said anchor coating being the dried film obtained from an aqueous composition of a butadiene-acrylonitrile copolymer and a water-soluble phenol-formaldehyde thermosetting resin.

3. The flexible coated article defined in claim 2 in which said base is a fabric woven from a continuous filament synthetic fiber.

ARTHUR BERNARD NESS.

REFERENCES CITED

The following references are of record in the file of this patent:

UNITED STATES PATENTS

| Number | Name | Date |
|---|---|---|
| 2,122,433 | Meigs | July 5, 1938 |
| 2,123,155 | Groff | July 5, 1938 |
| 2,405,038 | Jennings | July 30, 1946 |